(No Model.)

H. McCOY.
DOUBLE TREE CLIP.

No. 301,509. Patented July 8, 1884.

WITNESSES,
O. L. Petitdidier
S. W. Cantwell

INVENTOR.
Hamilton McKeoy
By C. P. Jacobs
Atty.

UNITED STATES PATENT OFFICE.

HAMILTON McCOY, OF INDIANAPOLIS, INDIANA.

DOUBLE-TREE CLIP.

SPECIFICATION forming part of Letters Patent No. 301,509, dated July 8, 1884.

Application filed January 28, 1884. (No model.)

*To all whom it may concern:*

Be it known that I, HAMILTON McCOY, a resident of Indianapolis, Marion county, Indiana, have made certain new and useful Improvements in Double-Tree Clips, a description of which is set forth in the following specification, reference being made to the accompanying drawings, in the several figures of which like letters indicate like parts.

My invention is a modification of an improvement upon the single and double tree clip for which Letters Patent No. 246,404 were issued to me on the 30th of August, 1881.

The present invention is especially adapted for horse-cars which have a draw-bar which is intended to enter the jaws of the clip, and a pin passed through all, holding them together.

Figure 1:
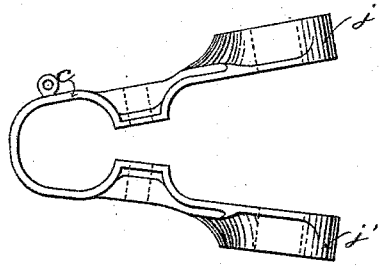
Figure 2:
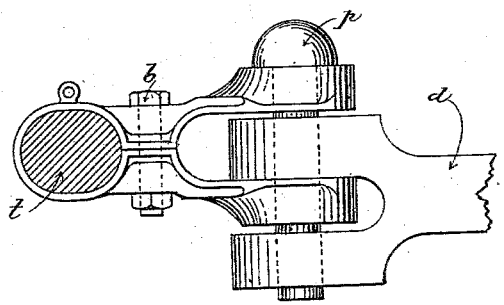

In the drawings, Figure 1 represents a side view of my device, the bolts and pins being removed. Fig. 2 is a side view with all parts in place.

In detail, $c$ is the clip-band which clasps the tree $t$, and $b$ is the bolt, which passes through openings shown in dotted lines in Fig. 1 and holds the clip firmly to the tree.

In Fig. 2, $d$ is the draw-bar of the car, which enters the mouth of jaws $j\ j'$, and $p$ is a pin which couples the draw-bar and jaws of the clip together.

The piece shown in Fig. 1 is preferably made of malleable iron and cast in one piece, and has some elasticity, so that when the bolt $b$ is removed the clip will fly open and the tree may easily be taken out.

What I claim, and desire to secure by Letters Patent, is—

1. The clip $c$, having jaws $j\ j'$, with openings for bolt $b$ and pin $p$, in combination with such bolt and pin and tree $t$, substantially as described.

2. The clip $c$, having jaws $j\ j'$, with holes for bolt $b$ and pin $p$, in combination with such bolt and pin, the tree $t$, and draw-bar $d$, substantially as described.

In witness whereof I have hereto set my hand this 15th day of January, 1884.

HAMILTON McCOY.

Witnesses:
C. P. JACOBS,
LUCY JACOBS.